(12) United States Patent
Pederson

(10) Patent No.: US 7,296,658 B1
(45) Date of Patent: Nov. 20, 2007

(54) TREE STAND SUPPORT BRACKET

(76) Inventor: Scott M. Pederson, 1718 W. Church Rd., Star Prairie, WI (US) 54026

( * ) Notice: Subject to any disclaimer, the term of this patent is extended or adjusted under 35 U.S.C. 154(b) by 284 days.

(21) Appl. No.: 11/072,807

(22) Filed: Mar. 4, 2005

(51) Int. Cl.
A43C 15/00 (2006.01)
(52) U.S. Cl. .................... 182/133; 24/71.1; 24/71 R; 248/230.8
(58) Field of Classification Search ............... 182/135, 182/136, 116, 20, 187, 188; 24/182, 71 R, 24/197, 170, 71 TD, 71 T, 68 CD, 71.1, 318, 24/343, 3.11, 3.12, 191–193; 248/229.25, 248/230.1, 230.8, 230.51, 229.1, 229.13, 248/229.14, 229.17, 229.23, 229.24
See application file for complete search history.

(56) References Cited

U.S. PATENT DOCUMENTS

| 2,804,742 | A | * | 9/1957 | Ray | 54/46.1 |
|---|---|---|---|---|---|
| 2,825,109 | A | * | 3/1958 | Nelson | 24/68 D |
| 3,246,929 | A | * | 4/1966 | Taggart | 297/476 |
| 3,641,630 | A | * | 2/1972 | Farley | 24/68 CD |
| 3,703,024 | A | * | 11/1972 | Johnson | 24/68 CD |
| 3,795,028 | A | * | 3/1974 | Weiss | 24/311 |
| 4,118,833 | A | | 10/1978 | Knox et al. | 24/68 |
| 4,359,808 | A | * | 11/1982 | Fontaine | 24/71 R |
| 4,451,956 | A | * | 6/1984 | Kawahara | 24/68 CD |
| 4,564,981 | A | * | 1/1986 | Knox | 24/68 CD |
| 5,199,527 | A | | 4/1993 | Jennings | 182/187 |
| 5,920,963 | A | * | 7/1999 | Chou | 24/170 |
| 5,983,573 | A | * | 11/1999 | MacKarvich | 52/23 |
| 6,631,537 | B1 | * | 10/2003 | Huang | 24/193 |
| 6,665,913 | B2 | * | 12/2003 | Kosh et al. | 24/193 |

* cited by examiner

Primary Examiner—Brian E. Glessner
Assistant Examiner—Colleen M Quinn
(74) Attorney, Agent, or Firm—Steven E. Kahm; Nikolai & Mersereau, P.A.

(57) ABSTRACT

The tree stand support bracket has three mutually pivotable parts and a belt for adjustably securing the length of the belt to fit the size of the tree it is attached to. The pivotable parts are the handle for tightening the belt, a belt strap adjustment portion for holding the free end of the strap and for locking the handle in place, and a belt buckle tree stand attachment portion having a hook for attaching a tree stand to. The tree stand support bracket bends in the middle to better engage a tree. By placing tree stand support brackets in several locations it is easy for a hunter to remove the tree stand from one location and move to another location by unhooking the tree stand from one support bracket and attaching it to another.

3 Claims, 3 Drawing Sheets

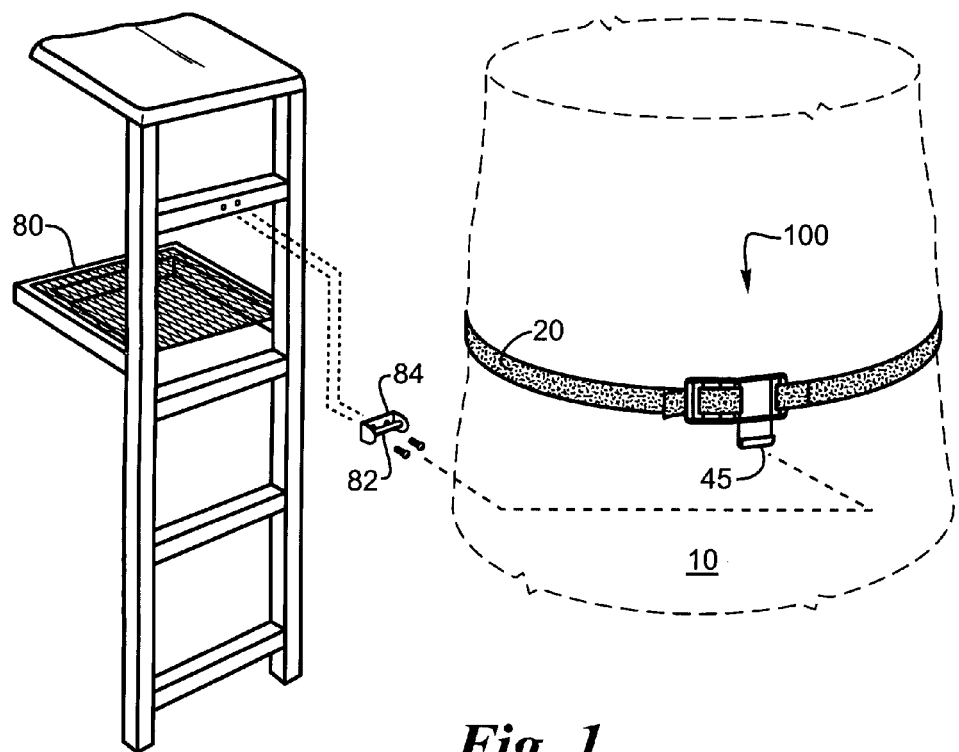
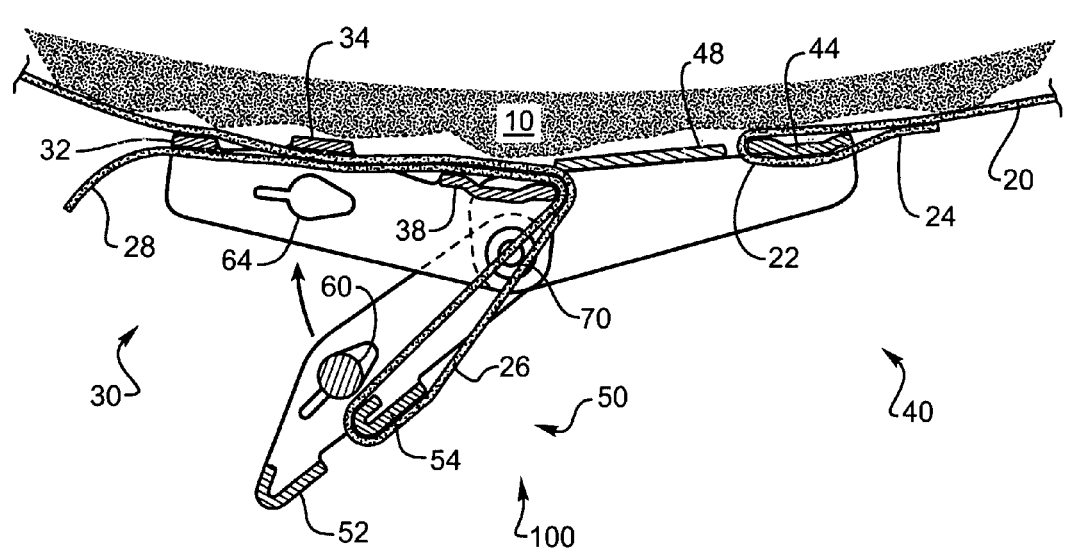

TREE STAND SUPPORT BRACKET

BACKGROUND OF THE INVENTION

1. Field of the Invention

This invention relates to tree stands and more particularly to how to quickly and easily attach a tree stand to a tree with a strap and buckle with a hook thereon for engaging the tree stand and supporting it.

2. Description of the Related Art

There are many devices for supporting a tree stand in a tree. Many require straps or chains connected directly to the tree stand however these devices are difficult to attach to the tree when connected to the tree stand as the tree stand needs to be supported while being attached to the tree. Since tree stands are frequently attached to the tree at an elevated position it is difficult to attach the tree stand to the tree.

There are tree stand supports which have a chain or belt for attaching a bracket or frame to a tree and then attaching the tree stand to the bracket, however these devices are generally expensive and not easy to carry around such that only one bracket is used with one tree stand. The brackets must also be made in a particular way to engage the tree stand rather than having a universal easy to carry around inexpensive tree stand support which can be connected to any tree stand such that a hunter can attach a tree stand support to a number of desired trees and then transport the tree stand between the tree stand supports on different trees for hunting at different locations by quickly and easily detaching the tree stand from one tree stand support and then attaching it to another tree stand support already attached to a tree.

Prior tree stand brackets have generally been straight such that their is only one point of contact with a the circumference of a tree which does not provide a lot of vertical support friction with the tree. It is preferred to have the bracket pivot to provide more contact points.

SUMMARY OF THE INVENTION

The tree stand support bracket has a belt for placing around the circumference of a tree. The bracket has one end of the belt fixedly attached thereto and the other end adjustably attached to the belt. The bracket has a handle for tightening the belt around the tree and locking into position such that the belt will not come loose. The bracket has a pivot in the middle for pivoting the bracket about the middle such that it bends around the tree for better contact therewith. The bracket has a hook for engaging a rod on a bracket attached to the tree stand such that the tree stand can easily be attached to the tree by raising the tree stand up and placing the rod in the hook on the bracket.

By having more than one tree stand support bracket attached to desired trees a hunter can easily take a tree stand down and move to a different location without having to take the tree stand support bracket down and then reattaching it to another tree.

OBJECTS OF THE INVENTION

It is an object of the invention to quickly and easily attach or remove a tree stand bracket in a tree.

It is an object of the invention to quickly and easily attach a tree stand to a tree stand bracket.

It is an object of the invention to be able to move tree stands to different reselected locations.

It is an object of the invention to make tree stand brackets inexpensively.

It is an object of the invention to make tree stand brackets easily transportable and light weight.

It is an object of the invention to make tree stand brackets, which can be attached to any tree stand.

It is an object of the invention to make tree stand brackets, which pivot in the middle to better engage a tree.

Other objects, advantages and novel features of the present invention will become apparent from the following description of the preferred embodiments when considered in conjunction with the accompanying drawings.

BRIEF DESCRIPTION OF THE DRAWINGS

FIG. 1 is a side view of the tree stand bracket in a tree ready to engage a tree stand.

FIG. 2 is a top view of the tree stand bracket in a tree ready to engage a tree stand.

DESCRIPTION OF THE PREFERRED EMBODIMENTS

Figure 3:
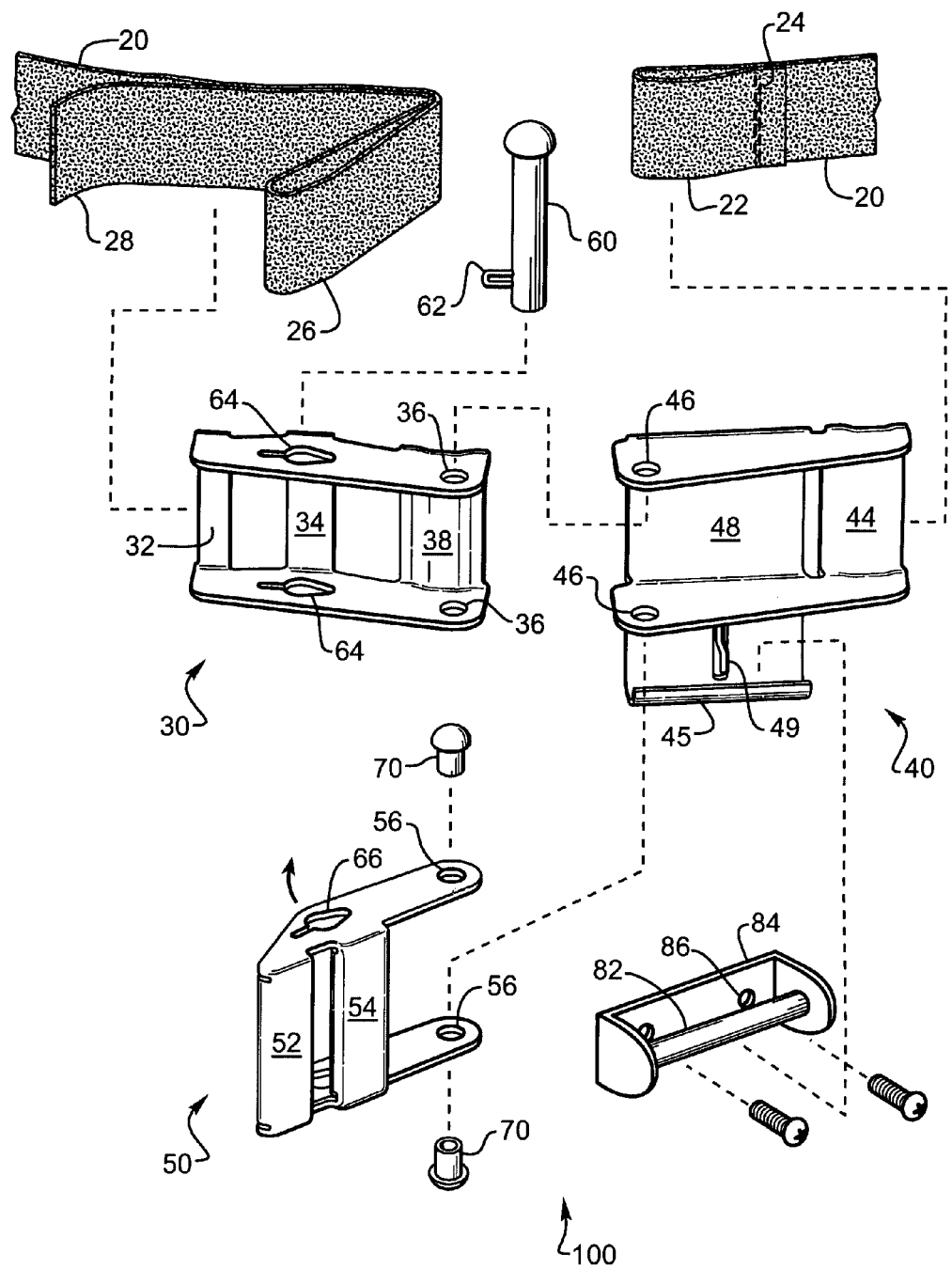
FIG. 3 is a perspective view of the tree stand bracket.

The tree stand support bracket 100 is used to support a tree stand 80 on a tree. The tree stand support bracket has a belt 20 which encircles a tree and can be tightened so that hook 45 on the belt buckle tree stand attachment portion 40 is held firmly in place. Since the tree stand supports are light weight and inexpensive a hunter can use more than one tree stand support bracket while hunting. The hunter can place several tree stand support brackets 100 in different locations such that all he has to do to move the tree stand 80 is unhook it from hook 45 and then lift the tree stand 80 to the hook on the tree stand support bracket 100 on the tree at the new location and place the rod 82 on the rod bracket 84 attached to the tree stand 80. The tree stand can thus be moved to various preselected locations quickly and easily.

The tree stand support bracket 100 has 4 main parts, the belt 20, a belt strap adjustment portion 30 for adjusting the length of the strap 20, a belt buckle tree stand attachment portion 40 for holding the tree stand 80 and a handle portion 50 for tightening the strap 20 to the tree. As best seen in FIG. 3 the a belt strap adjustment portion 30 has an aperture 36, the a belt buckle tree stand attachment portion 40 has an aperture 46 and the handle portion has an aperture 56 which are aligned an pivot on rivet 70 such that all three parts pivot with respect to each other. The belt strap adjustment portion 30 and the belt buckle tree stand attachment portion 40 pivot with respect to each other to provide a bend in the middle of the tree stand support bracket 100 such that it bends around the tree to provide a better contact with the tree. The handle portion 50 has a cross bar for engaging strap 20 and pulling on the strap as the user pushes on the panel portion 52 to tighten the strap 20 in place around the tree 10 and lock it in place. The handle portion 50 has an aperture 66 in its side which aligns with apertures 64 on belt strap adjustment portion 30 such that lock pin 60 extending therethrough and held in place by cotter pin 62 locks the handle portion 50 in place ensuring that the belt will not come loose when the tree stand is attached.

Figure 4:
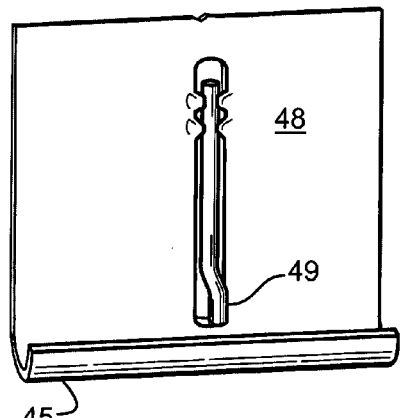
FIG. 4 is a perspective view of the hook used on the tree stand bracket.
Figure 5:
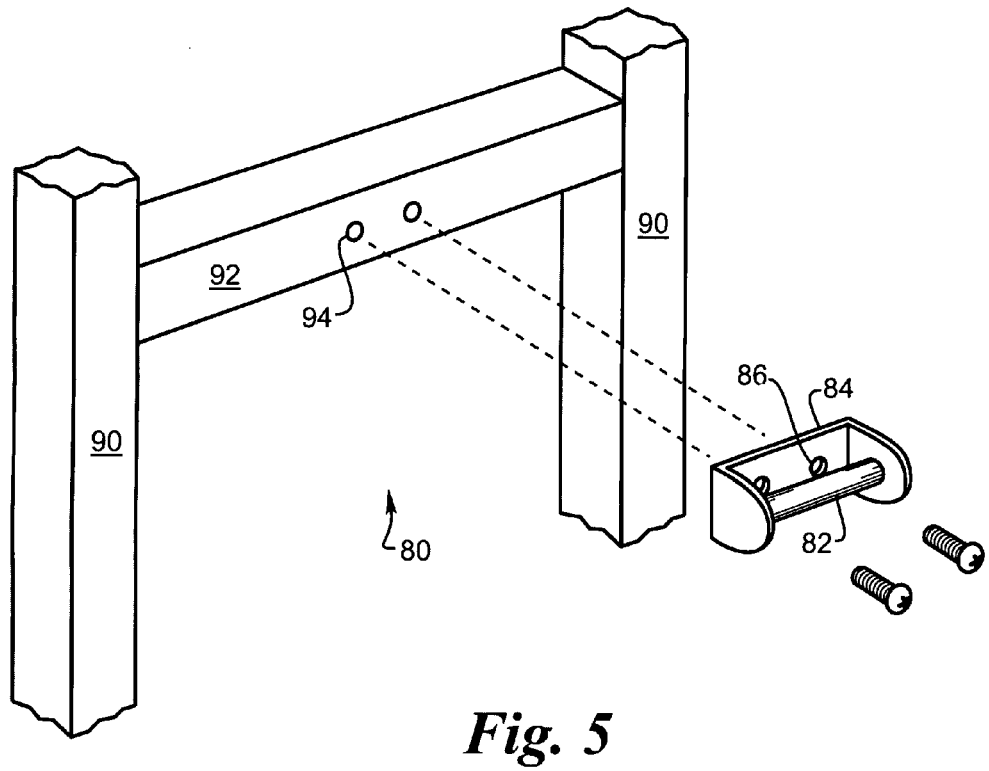
FIG. 5 is a perspective view of the rod bracket for attachment to a tree stand.

The belt strap adjustment portion 30 has cross bars 32, 34 and 38 which allows the belt to be looped through the belt strap adjustment portion 30 by going over and under the cross bars 32, 34 and 38 and then over the cross bar 26 on handle portion 50 and back, by doubling over on its path. The strap can be adjusted for length by sliding the belt through the belt strap adjustment portion 30 and the handle portion 50. The free end 28 of the strap 20 is preferable near the belt strap adjustment portion 30 and can easily be threaded therethrough to attach the strap 20 to the buckle mechanism. The other end of strap 20 is looped around cross bar 42 of the belt buckle tree stand attachment portion 40 and sewn together with stitching 24 to form a loop securing the strap 20 to the belt buckle tree stand attachment portion 40. The belt buckle tree stand attachment portion 40 also has a cross bar 42 near the apertures 46 and a bracket 48 having a hook 45 and a retention spring 49. The bracket 48 is shown in greater detail in FIG. 4 showing how a rod 82 from a tress stand rod bracket 84 is held by the bracket 48. Retention spring 49 allows the rod 82 to be admitted to hook 45 by pressing the free end toward the bracket 48 near the hook 45. The retention spring 49 then blocks the rod 82 on rod bracket 84 from escape thereby securing it to the rod bracket 84 to the hook 45 until it is released by pressing the retention spring downward to remove rod 82. When rod bracket 84 is attached to a tree stand by use of bolts through apertures 86 on bracket 84 and apertures 94 on a rung 92 between rails 90 on the tree stand 80 the stand can be secure to the tree stand support bracket 100. Since the rod bracket 84 is easy to attach to any tree stand 80 the rod bracket 84 and tree stand support bracket 100 can be sold as a unit for use with any tree stand. Extra tree stand support brackets 100 can also be obtained for use with the tree stand 80.

Obviously, many modifications and variations of the present invention are possible in light of the above teachings. It is therefore to be understood that, within the scope of the appended claims, the invention may be practiced otherwise than as specifically described.

What is claimed is:

1. A tree stand support bracket comprising:
   a strap adjustment portion having pivot apertures at one end,
   a attachment bracket portion having pivot apertures at one end, and
   a handle portion having pivot apertures at one end,
   a rivet for pivotably attaching the strap adjustment portion, the attachment bracket portion, and the handle portion along one axis so that they mutually pivot about the same axis on their respective pivot apertures,
   the attachment bracket portion having a bracket with a hook thereon, and
   a belt attached to the attachment bracket portion at one end of the belt and adjustably attached to the strap adjustment portion and the handle portion near the other end of the belt.

2. A tree stand support bracket as in claim 1 wherein,
   a retention spring attached to the bracket secures an opening region over the hook such that it will admit articles to the hook while preventing their removal without depressing the retention spring.

3. A tree stand support bracket as in claim 1 wherein,
   a locking aperture in the handle portion which aligns with a locking aperture in the strap adjustment portion such that a pin inserted in the locking apertures holds the handle portion adjacent the strap adjustment portion.

\* \* \* \* \*